Patented Oct. 13, 1936

2,057,163

UNITED STATES PATENT OFFICE 2,057,163

PREPARATION OF SOLUTIONS OF HYDROXY-CELLULOSE ETHERS

George A. Richter, Berlin, N. H., assignor to Brown Company, Berlin, N. H., a corporation of Maine No Drawing. Application June 16, 1934, Serial No. 730,917

4 Claims. (Cl. 106—40)

This invention relates to the preparation of solutions of hydroxy-cellulose ethers such as are suitable for various uses, some of which will hereinafter be mentioned. It is concerned more particularly with a caustic soda solution of hydroxy-alkyl ethers of cellulose, for instance, the hydroxy-ethyl ether of cellulose.

In making ethers of the foregoing character, it has been the practice to etherify mercerized cellulose, that is, cellulose that has undergone treatment with strong caustic soda solutions, for instance, solutions of 10% to 18% or even greater strength. Etherification was performed either after only part of the caustic soda solution was squeezed or otherwise removed from the mercerized cellulose and the resulting soda cellulose was more or less aged or after substantially all of the caustic soda solution was washed from the mercerized cellulose. As a result of such practice, it is possible to produce a hydroxy-cellulose ether that can be dissolved to the desired degree in a caustic soda solution.

I have found that there are cellulose pulps that can be converted in a substantially unmercerized state into hydroxy-cellulose ethers and further that the ethers so prepared can be dissolved in substantial amount in a caustic soda solution to produce a useful composition. Indeed, the solutions of hydroxy ethers of unmercerized cellulose tend to yield coatings, films, and other products of higher dry and wet strength than those realized from solutions of hydroxy ethers of mercerized cellulose. In accordance with the present invention, therefore, it becomes possible to do away with mercerization and such after-treatment and expense as the step of mercerization entails.

In practicing my invention, I may start with a refined wood pulp that has been prepared by subjecting wood chips to a two-stage cooking operation, first, in an acid liquor short of fiber liberation and, second, in a dilute alkaline liquor that liberates the wood fibers as a pulp of high alpha cellulose content. After bleaching, such pulp is ready for direct etherification despite the fact that the alkaline liquor used in its preparation was far below mercerizing strength, for instance, was of an alkalinity corresponding to a caustic soda solution of only about 2% to 3% strength and was used at an elevated temperature, say, in excess of 212° F., unfavorable to any mercerizing effect whatever. The substantially unmercerized pulp may be converted into the desired hydroxy-alkyl ether of cellulose in any approved manner. Thus, in preparing the ethyl ether of cellulose, a mixture of water and pulp of about 40% cellulose content is first produced. A small amount of suitable catalyst of etherification, say, 1% of pyridine or caustic soda, is then added to the mixture. This addition may take place in a churn that can be closed off from the atmosphere and that can be tumbled continuously so as to promote uniform etherification of its contents. After most of the air has been evacuated from the closed churn charged with the catalyst-containing cellulose, ethylene oxide vapor in the amount of about 10%, based on the weight of the dry cellulose, may be injected into the churn, the charge heated to a temperature of, say, 55° C., and the churn tumbled for about 2 to 6 hours, at the end of which time the ethylene oxide has been substantially completely consumed by reaction upon the cellulose to produce the hydroxy-ethyl ether of cellulose. The churn is then opened and the charge of etherified fiber is removed therefrom and washed substantially free of catalyst. The etherified fiber is now ready to be dissolved in caustic soda solution. To this end, the etherified fiber may be mixed with a caustic soda solution of about 7% to 8% strength to produce a mixture containing 1% to 2% of the ether. A solution of this amount of ether may be promoted by freezing the mixture solid and then macerating it while it is being thawed. The resulting solution is substantially clear and fluent. It may be applied successfully in coating or impregnating papers, fabrics, and the like, and, under certain conditions, in the manufacture of films. The ether may, as usual, be set or regenerated from solution by the use of suitable acidic media, such as a sulphuric acid solution of sodium sulphate.

The cellulose ether solutions of about 6% to 8% ether content are best adapted for making such ultimate products as artificial silk filaments and films, but such solutions when prepared from hydroxy ethers of substantially unmercerized cellulose tend to gel either in the course of preparation or immediately thereafter. It is possible to increase the solution stability of such ethers, that is, their tendency to remain in solution without gelling at concentrations greater than 1% to 2%, by using a greater amount of etherifying agent in their preparation. Thus, this may be done by using, say, 20% to 30% of ethylene oxide, based on the dry weight of the substantially unmercerized cellulose fiber, in preparing the hydroxy-ethyl ether of cellulose. In such case, the ether tends to go into solution far more readily, insomuch that in some cases the steps of freezing the mixture of ether and caustic soda solution and of thawing the mixture may be dispensed with in producing a clear solution of the desired stability and cellulose ether content.

When it is undesirable from an economic standpoint to use high percentages of etherifying agent in producing hydroxy ethers of substantially unmercerized cellulose having the desired stability in solutions of greater than 1% to 2% ether content, it is possible to adopt other expedients in arriving at stable solutions of such ether content. Thus, it is possible to subject the unmercerized cellulose pulp used as raw material or the ether prepared therefrom to a hydrolyzing treatment that tends to lower its so-called solution viscosity. The solution stability of the resulting ether may thus be enhanced to a degree such that a solution of the ether does not tend to gel for a considerable period of time even at a cellulose ether content of 8%. As illustrating such practice, an ether prepared as in the foregoing example by etherifying substantially unmercerized wood pulp with only about 10% ethylene oxide, based on the weight of dry pulp, may, after washing, be digested for about 2 to 8 hours at elevated temperature, for instance, 212° F. to 260° F., in a dilute solution of sulphuric or other mineral acid, for instance, in a 0.5% sulphuric acid solution. After washing the hydrolyzing ether, it may be dissolved in an amount up to 8% in a caustic soda solution of 7% to 8% strength to form a clear solution of good stability. Solution of the ether may be promoted by freezing it in admixture with the caustic soda solution and then macerating the mixture while it is being thawed.

It is thus seen that the unmercerized cellulose employed in making the composition of the present invention may have either a high solution viscosity or a low solution viscosity. To this end, I may use unmercerized cellulose having a so-called cuprammonium solution viscosity of as low as about 0.3, which viscosity value approximates that of the mercerized cellulose heretofore generally employed in making hydroxy cellulose ethers; or I may use unmercerized cellulose having a cuprammonium solution viscosity of as hight as 20 to 30. The unmercerized cellulose of low solution viscosity that I employ may be a bleached pulp prepared by suitable two-stage pulping or fiber-liberating processes, for instance, a process wherein the first stage involves cooking wood chips or other appropriate raw cellulosic material in a solution of mineral acid and the second stage involves cooking to complete fiber liberation in a dilute alkaline liquor, as disclosed in my Patent No. 1,880,043, dated September 27, 1932, or in my Patent No. 1,917,545, dated July 11, 1933. The unmercerized cellulose of high solution viscosity that I employ may be a bleached, refined wood pulp such as is prepared by putting sulphite pulp or other suitable chemical wood pulp through a refining operation in a comparatively dilute alkaline liquor under temperature, time and other conditions resulting in a product of an alpha cellulose content upwards of about 93%. One grade of such bleached, refined wood pulp as it appears on the market for nitration purposes has a cuprammonium solution viscosity of 6, whereas another grade of such pulp has a cuprammonium solution viscosity of 20. When such pulps enter into the composition of the present invention, it is possible to realize from the composition coatings, films, and other products of excellent strength. To be sure, the cellulose ether solutions into which such latter pulps are converted must be of comparatively low cellulose ether content, say, 1% to 2%, in order to be possessed of the desired fluency, but an undesirably viscous or gel-like solution may be avoided at as high as about 8% ether content in solution by reducing the solution viscosity of such etherified pulps in suitable hydrolyzing liquors, oxidizing liquors, or other reagents, as hereinbefore indicated.

In speaking about "unmercerized cellulose" in the foregoing description and in the appended claims, I mean cellulose that has not undergone contact with strong caustic soda solution for a period of time such that substantial mercerization of the fiber is effected. In this connection, however, it is again to be observed that comparatively dilute caustic soda solution of, say, about 1% to 5% strength, may be used in refining wood pulp or other cellulose fiber destined to enter into the composition of the present invention, as such solution does not exercise an appreciably mercerizing effect upon cellulose fiber particularly when it is applied at elevated temperature.

I claim:—

1. In a process involving the production of a caustic soda solution of hydroxy ether of cellulose, that practice which comprises etherifying cellulose fiber in unmercerized condition to form such ether, digesting the resulting ether at elevated temperature in a dilute solution of mineral acid to lower its solution viscosity sufficiently to enable its dissolution in a caustic soda solution of about 8% strength in the amount of about 6% to 8%, and dissolving the digested ether in such caustic soda solution to form a substantially clear and ungelled solution.

2. In a process involving the production of a caustic soda solution of hydroxy ether of cellulose, that practice which comprises etherifying cellulose fiber in unmercerized condition to form such ether, digesting the resulting ether at a temperature of at least about 212° F. for some hours in a dilute solution of mineral acid to lower its solution viscosity sufficiently to enable its dissolution in a caustic soda solution of about 8% strength in the amount of about 6% to 8%, and dissolving the digested ether in such caustic soda solution to form a substantially clear and ungelled solution.

3. In a process involving the production of a caustic soda solution of hydroxy ether of cellulose, that practice which comprises etherifying cellulose fiber in unmercerized condition to form such ether, digesting the resulting ether for not less than about two hours at a temperature of about 212° to 260° F. in a dilute solution of mineral acid to lower its solution viscosity sufficiently to enable its dissolution in a caustic soda solution of not greater than about 8% strength in an amount of at least about 6% to 8%, and dissolving the digested ether in such amount in such caustic soda solution to form a substantially clear and ungelled solution.

4. In a process involving the etherification of unmercerized cellulose fiber to form hydroxy ether of cellulose and the dissolution of the ether in the amount of about 1% to 8% in caustic soda solution of about 6% to 8% strength to form a substantially clear and ungelled ether solution, that step which comprises digesting the cellulosic material at elevated temperature in a dilute solution of mineral acid at any stage of the process before it is dissolved and thereby lowering its solution viscosity sufficiently to enable its aforesaid dissolution.

GEORGE A. RICHTER.